Aug. 22, 1939.  E. G. BAILEY ET AL  2,170,345
VAPOR GENERATOR
Original Filed Dec. 18, 1935   13 Sheets-Sheet 1
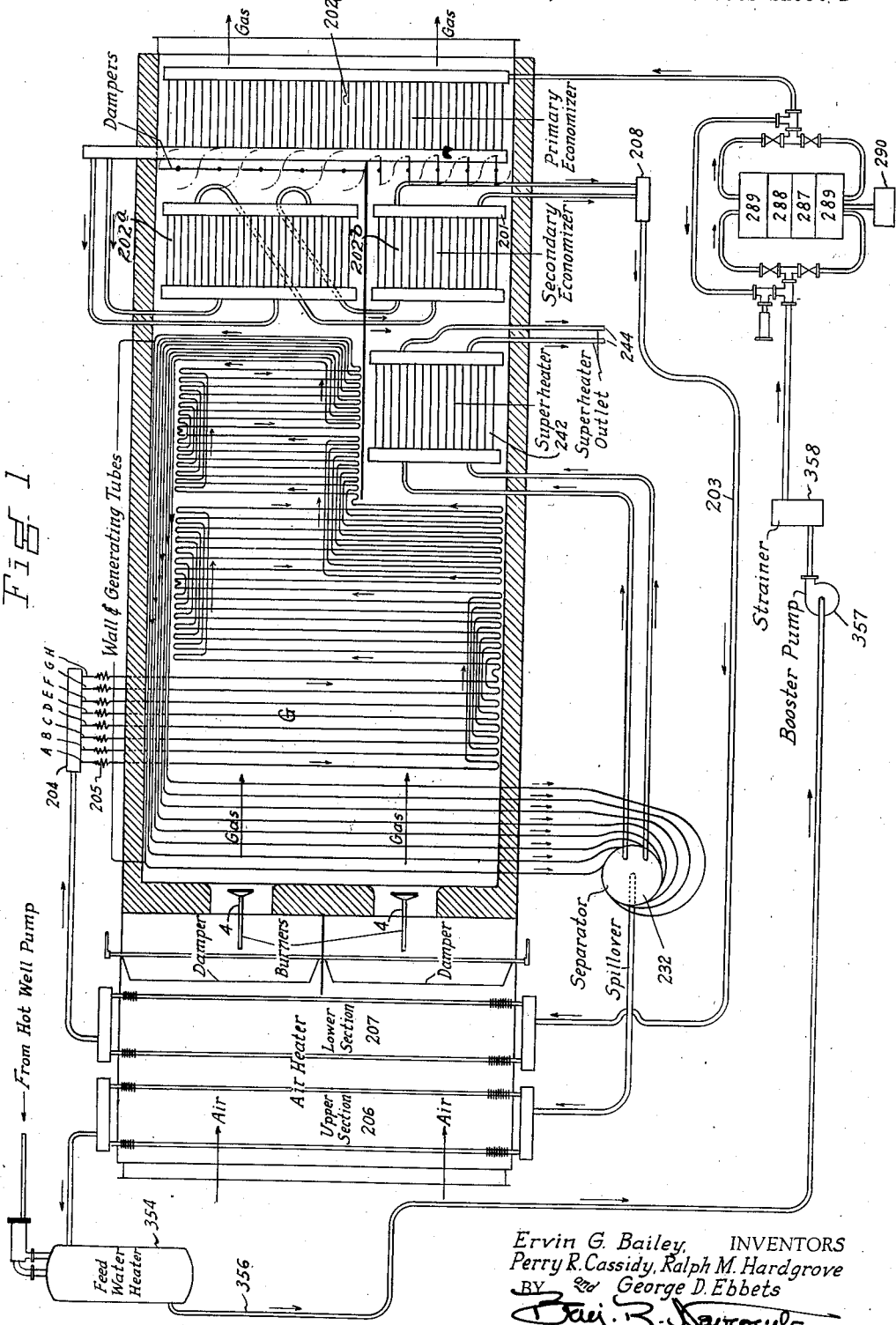
Ervin G. Bailey, INVENTORS
Perry R. Cassidy, Ralph M. Hardgrove
BY 2nd George D. Ebbets
ATTORNEY.

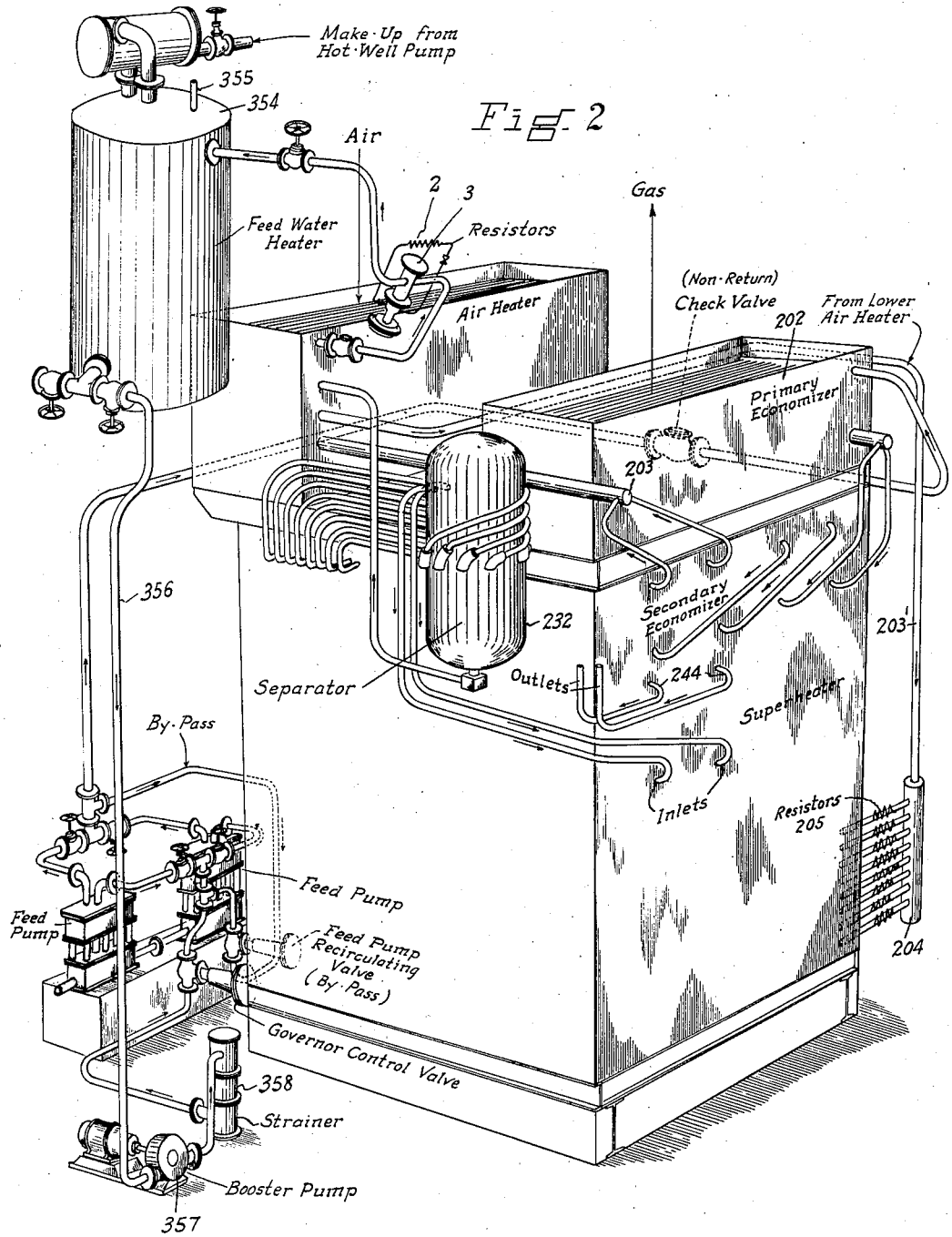

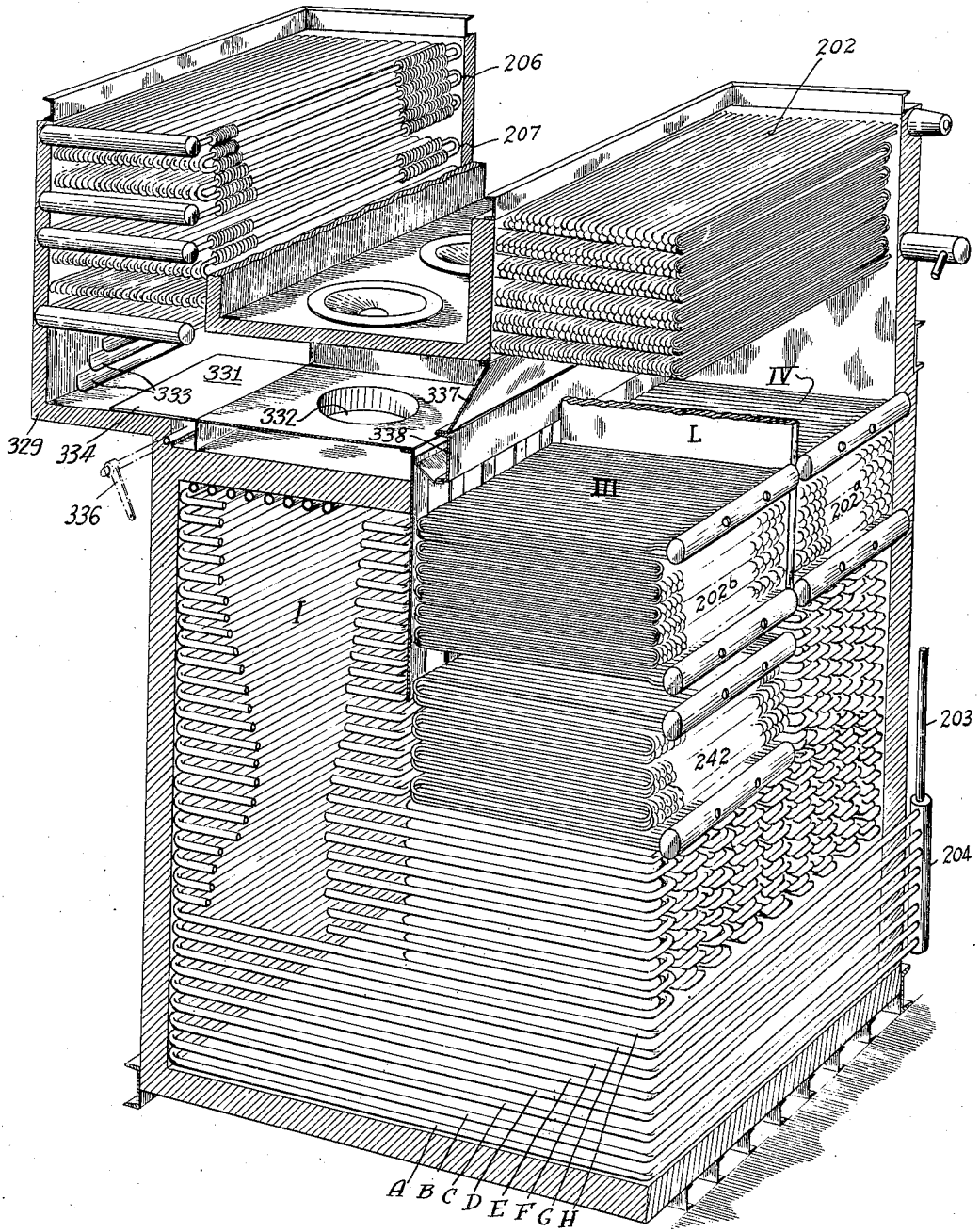

Aug. 22, 1939.  E. G. BAILEY ET AL  2,170,345
VAPOR GENERATOR
Original Filed Dec. 18, 1935  13 Sheets—Sheet 5

Ervin G. Bailey, INVENTORS
Perry R. Cassidy, Ralph M. Hardgrove
BY  and  George D. Ebbets.

ATTORNEY.

Aug. 22, 1939.  E. G. BAILEY ET AL  2,170,345
VAPOR GENERATOR
Original Filed Dec. 18, 1935   13 Sheets-Sheet 6
Fig. 5
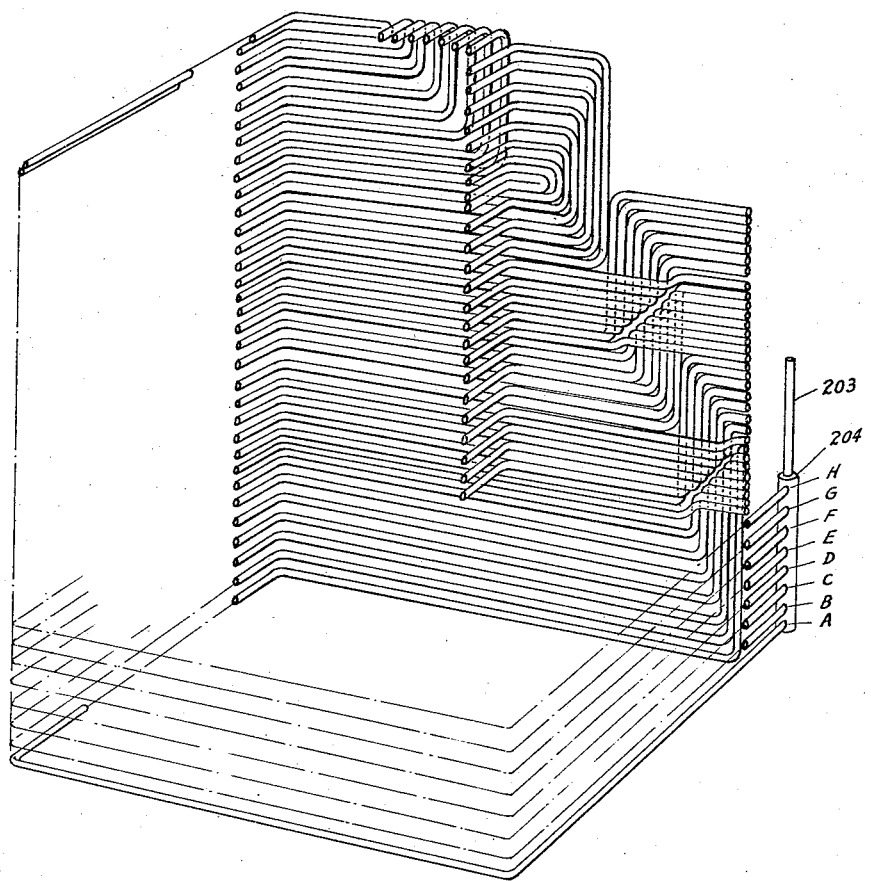
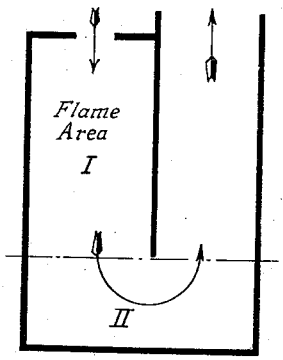
Fig. 17
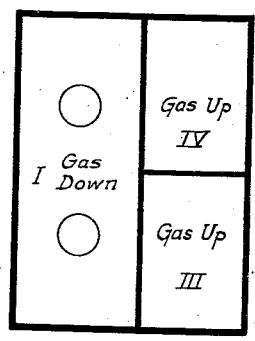
Fig. 18
Ervin G. Bailey, INVENTORS
Perry R. Cassidy, Ralph M. Hardgrove
BY and George D. Ebbets
ATTORNEY.

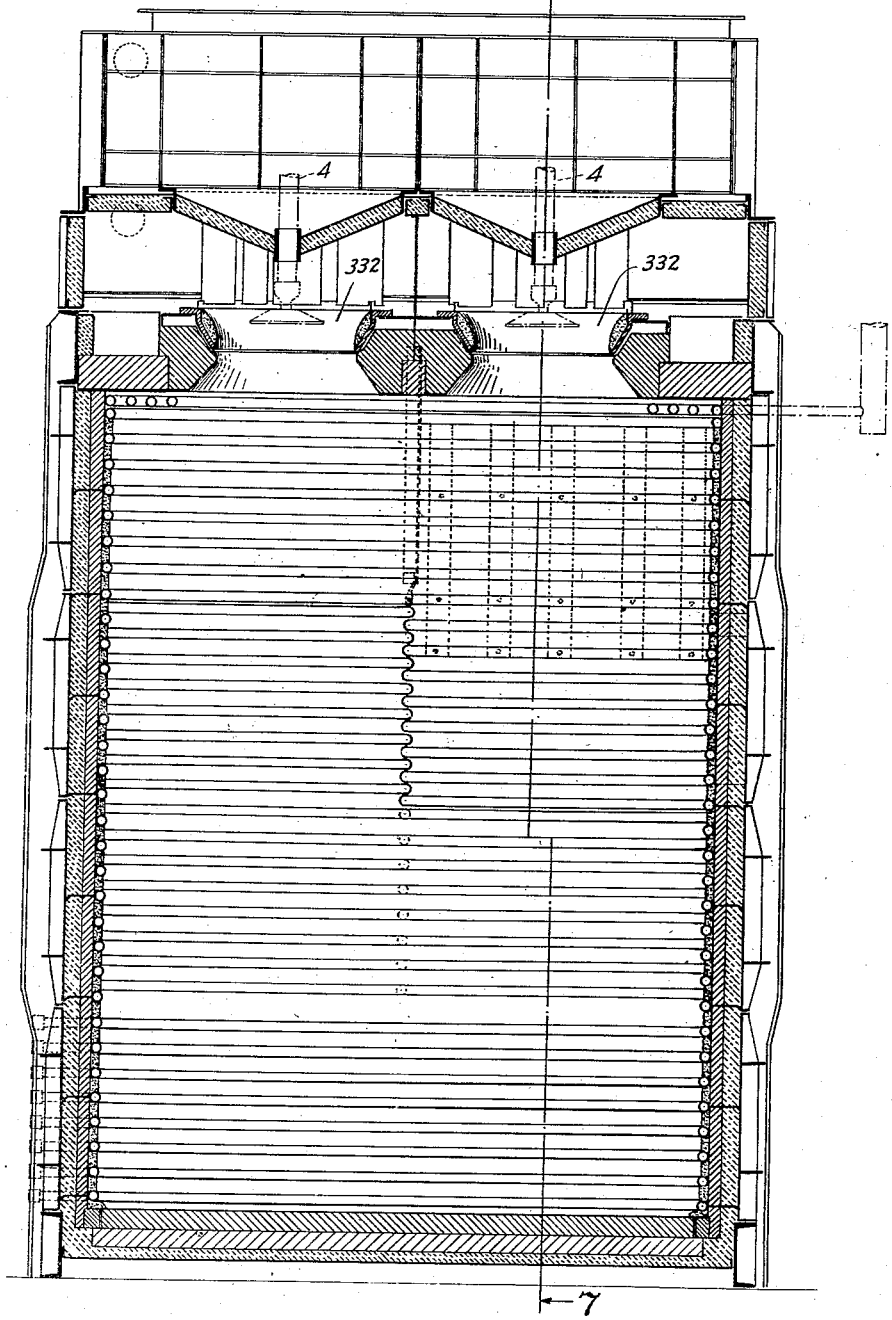

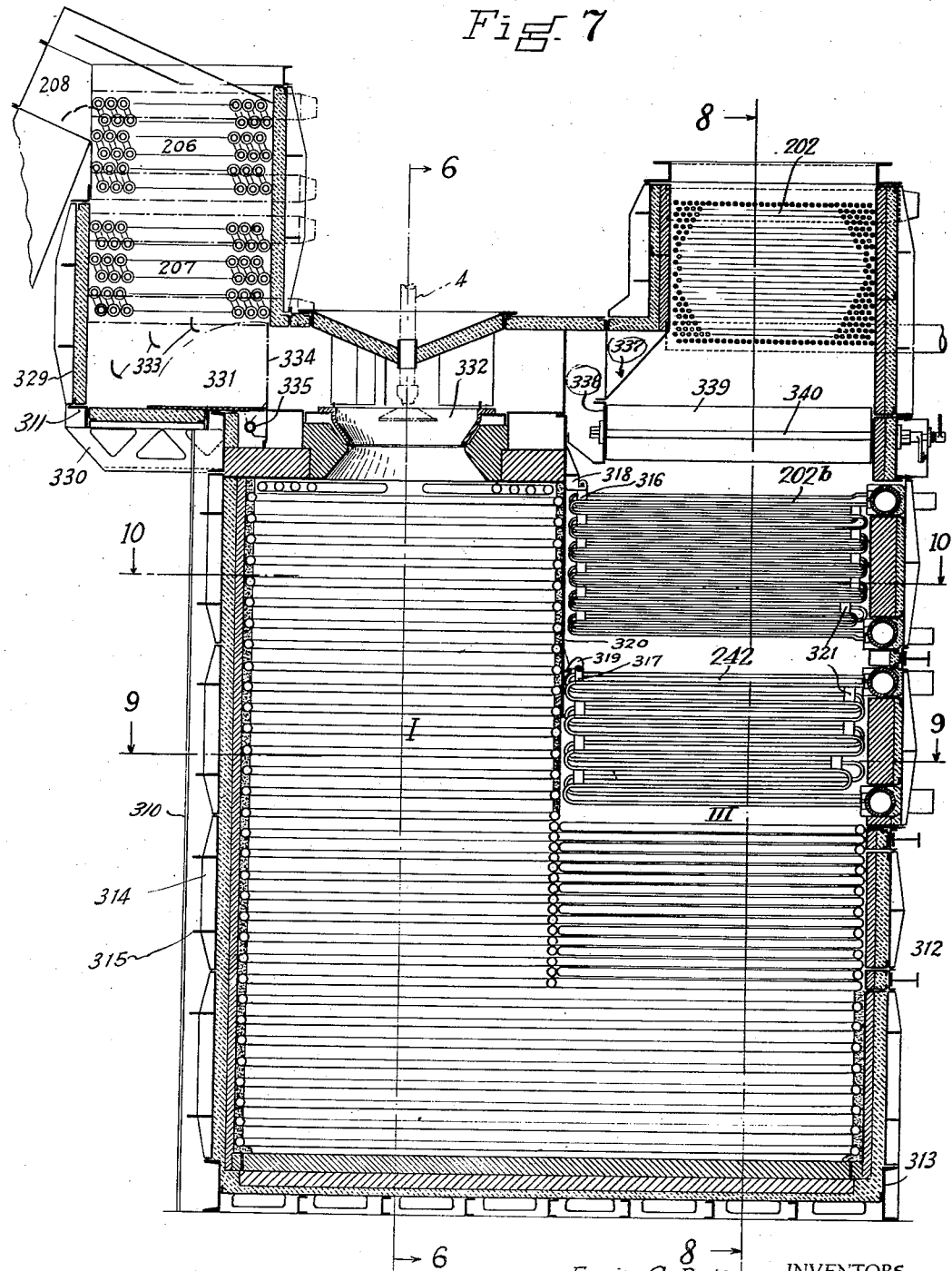

Aug. 22, 1939.  E. G. BAILEY ET AL  2,170,345
VAPOR GENERATOR
Original Filed Dec. 18, 1935   13 Sheets-Sheet 9

Ervin G. Bailey, INVENTORS
Perry R. Cassidy, Ralph M. Hardgrove
and George D. Ebbets.
BY
[signature]
ATTORNEY.

Aug. 22, 1939.　　　　E. G. BAILEY ET AL　　　　2,170,345
VAPOR GENERATOR
Original Filed Dec. 18, 1935　　13 Sheets-Sheet 10
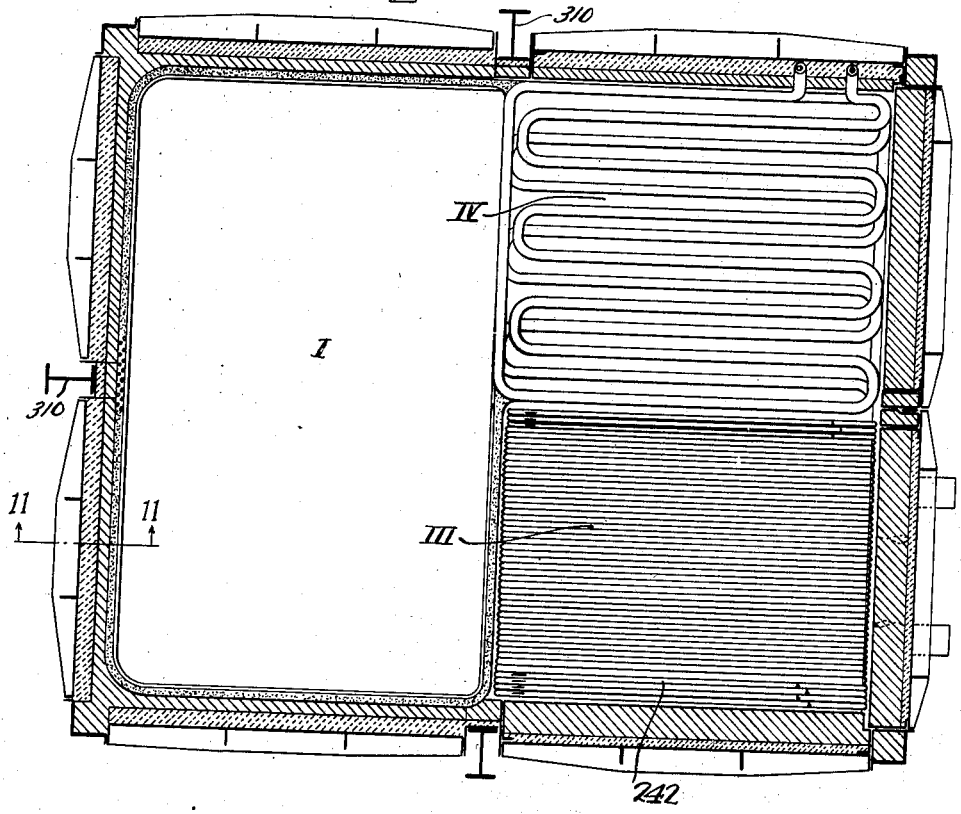
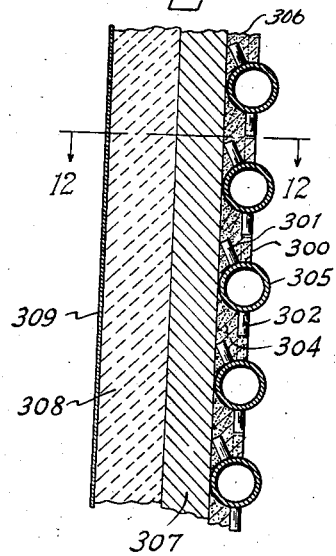
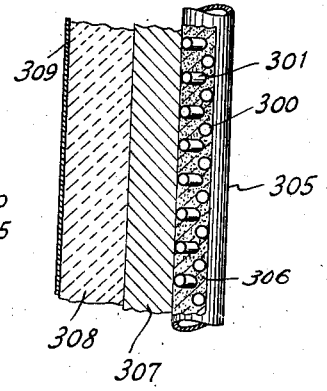
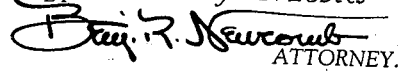
Ervin G. Bailey, INVENTORS
Perry R. Cassidy, Ralph M. Hardgrove
and George D. Ebbets
BY
ATTORNEY.

Aug. 22, 1939.   E. G. BAILEY ET AL   2,170,345
VAPOR GENERATOR
Original Filed Dec. 18, 1935   13 Sheets-Sheet 11

Ervin G. Bailey, INVENTORS
Perry R. Cassidy, Ralph M. Hardgrove
and George D. Ebbets.
BY
ATTORNEY.

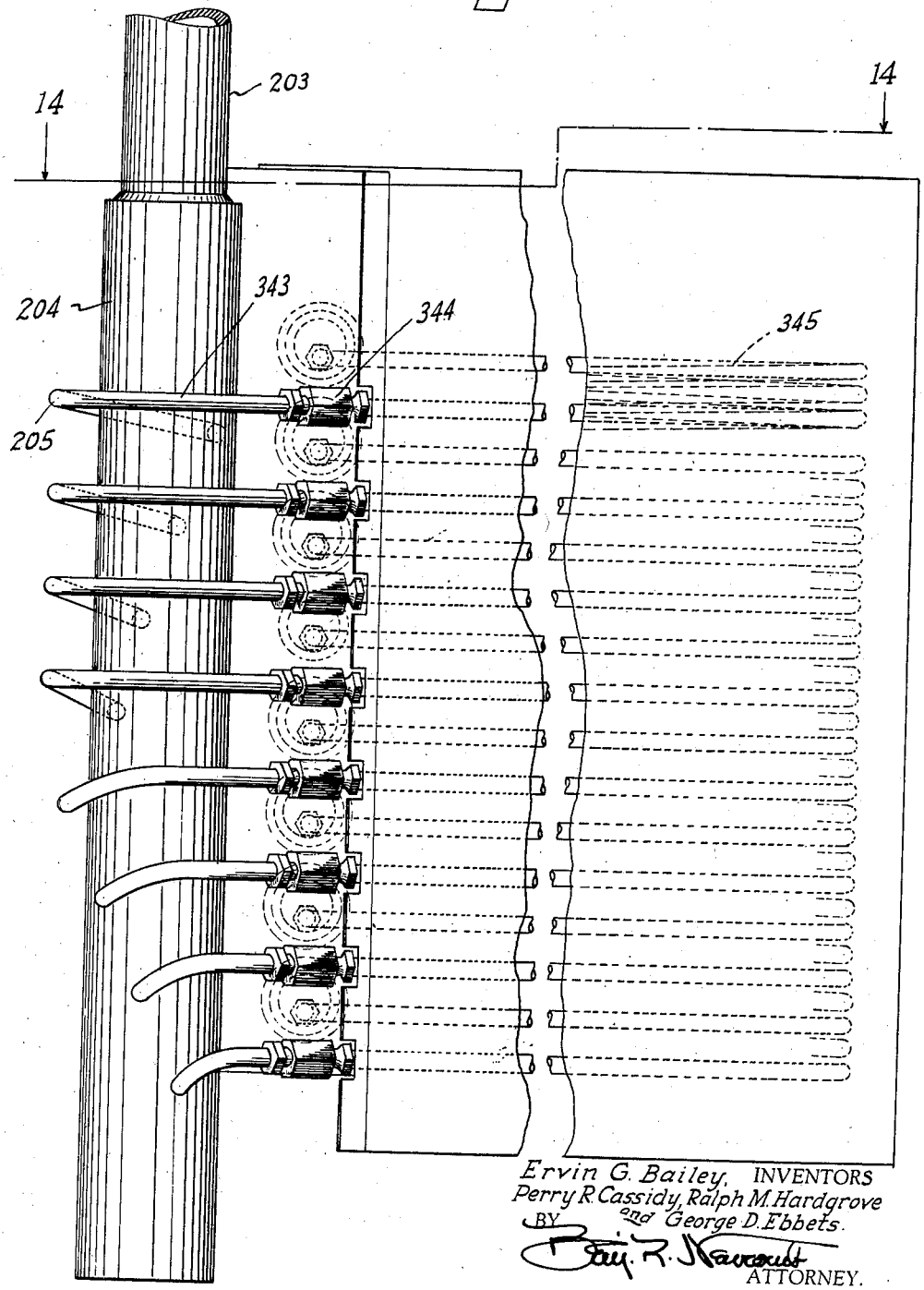

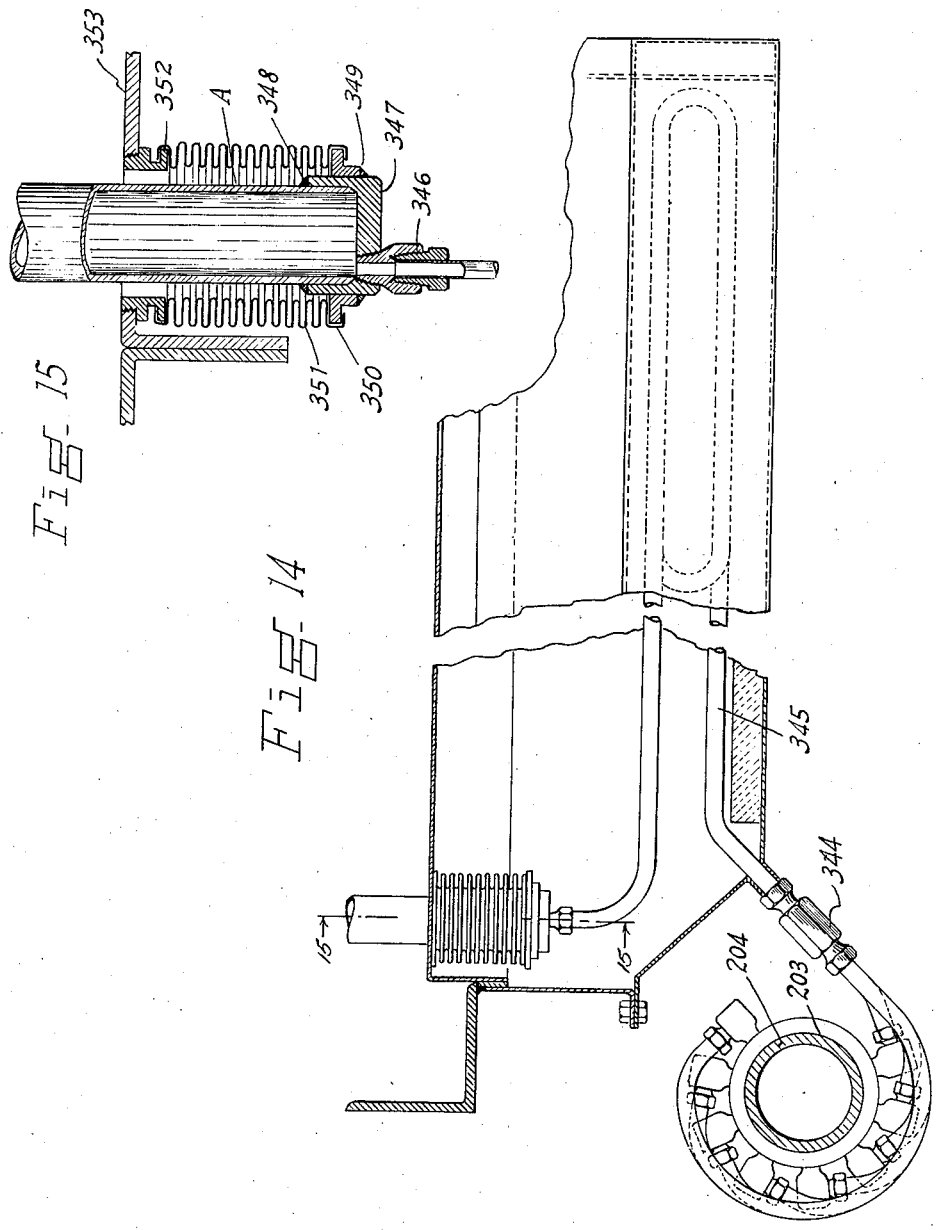

Patented Aug. 22, 1939

2,170,345

UNITED STATES PATENT OFFICE 2,170,345

VAPOR GENERATOR

Ervin G. Bailey, Easton, Pa., and Perry R. Cassidy, Short Hills, Ralph M. Hardgrove, Westfield, and George D. Ebbets, Kenilworth, N. J., assignors to The Babcock & Wilcox Company, Newark, N. J., a corporation of New Jersey Application December 18, 1935, Serial No. 55,021
Renewed June 22, 1939

16 Claims. (Cl. 122—235)

This invention is a light weight, compact, forced flow steam generator for making superheated steam at high pressure, and is of small liquid and heat storage capacity, but responsive to large and sudden variations in steam demand with substantially inappreciable time lag, thus rendering the same suitable for variable speed motive power aplications in a range of sizes such, for instance, as are adapted to locomotive, ship and other classes of service, and especially for conditions where weight and standby expense requirements have heretofore been better satisfied by the heavy oil engine than by former types of steam equipment.

Such a steam generator as the present invention, having small water storage and operated with a wide range combustion device, provides a combination rendering practical extremely high heat release rates, with the consequent ability to economically handle practically instantaneous load changes from zero to maximum, and vice versa.

This generator, suitable for high steam pressures, has a small water storage capacity with relatively large heat absorbing surface, which necessarily characterizes the construction as one incorporating small bore tubes of great length and in multiple for the desired capacity.

The entire heating surface comprises small bore tubes, arranged in sections, through which water and steam flow in a novel and particular manner, and in each section the multiple flow parts are connected in parallel between junctions which are of small diameter without requiring the use of the usual steam and water drums.

The several sections, including economizer, steam generating, superheating, and air heating sections are arranged in a novel combination, and with certain new features of construction, each and all contributing to the major objective.

One feature of the arrangement resides in the relation of the small bore tubular heating surface with reference to the furnace, and to the passage of the hot gases of combustion from the furnace to other portions of the unit. The small bore tubes are utilized to the fullest extent in the furnace walls, especially the tubes of the steam generating section, to reduce heat storage and provide a safe wall construction for this intensely heated space.

Another feature is that of insuring internal wetness of each of these multiple intensely heated steam generating tubes, arranged in parallel, by constantly maintaining an excess of water in them over and above that which can be evaporated in a single passage therethrough to prevent overheating, and the removal of the excess unevaporated water in a manner to carry away scale forming solids with such removed liquid, all as set forth in the copending application of E. G. Bailey Serial No. 55,020 filed concurrently herewith.

The steam generator of the present invention is encompassed within flat walls, and the major part of the enclosed space is divided into sections by the arrangement of the portions of the small bore tubes to form, or to be disposed within, the outer boundary walls, and also partition walls that divide the space. This utilization of the small bore tubes of the heating surface to divide the whole space into sections arranged in a particular manner, is a feature of this invention, and four such spaces are provided, one being the upper part of the furnace for the flame of a burner located on the top for downward firing, and including about half of the horizontal area; a second being an extension of the furnace, at a lower level, and comprehensive of the whole area of the bottom or floor, while the third and fourth are side by side parts of the remainder of the horizontal cross section beside and behind the first furnace part and for upwardly directing flowing gases from the furnace extension in two parallel streams.

The heat absorbing and steam generating capacity of the generator is greater per unit of weight and space than is possible for usual steam generators, and its flexibility, furthermore, is unequaled by usual steam generators in the corresponding sizes for the intended motive power service. These useful and novel results are attained by means that insure the parts, at all times, against damage from overheating and which, of themselves, are features of the present invention; and with them there are also incorporated features contributing to high efficiency, the whole being peculiarly susceptible to automatic control.

High efficiency is assured by steam generating tube heat absorption in the furnace and in gas passage walls, cooperative with a high furnace temperature attained by the use of some reradiating refractory between wall tubes, by the disposal of parts of the lengths of the long small bore steam generating tubes across the path of the hot gases, and by the relative positions of the several sections of the heating surface with relation to gas flow and gas temperatures.

Safety against overheating is assured, for the steam generating tubes, by the maintenance of excess water through to the tube terminals, and for the superheater tubes by positioning them behind a radiant heat screen and by control of the fraction of the whole weight of furnace exit gases passing over them, the remainder of the gas volume passing over steam generating and economizer tubes in the two parallel gas up-flow parts of the space behind the initial upper furnace down-fired flame space, after the gases have reversed their direction of flow 180° over the whole bottom. As a contribution to high efficiency the tubes disposed across the upwardly directed gas passage are closely spaced creating a high gas mass flow to increase the convection heat transfer rate, and all the air for combustion is pumped into the furnace in a manner providing a sufficiently high furnace pressure to insure such high gas mass flow.

The heat absorbing surface bounding the flow path for the water, where steam is being generated, as stated, is comprised of several long small bore tubes between which the water is equally divided and arranged for thermal symmetry by equal exposure to the source of heat. At the end of this generating section there is a separator to divide water and steam. The saturated steam is then passed through a superheater, while the excess water pumped through the tubes, in relation to the fuel fed and burned and for the purpose of preserving safety wetness and preventing scale deposit, is diverted out of the separator under regulated separator water level conditions, thus furnishing a control actuator in the generator operation, as will be hereinafter set forth. From the separator there is a normal continuous, and an additional regulated spillover, or removal, of excess water limited as to maximum and minimum amount so that there is always being fed to and through the economizer and steam generating sections more water than can be converted into steam in the generating section, although the ratio or volume of such excess water or spillover represents but a small part of the total volume of steam produced, and is sufficient, but no more than sufficient, to insure tube temperature safety by tube wetness and to carry off scale-forming material.

In vapor generators of the character mentioned having small water and small heat storage with high furnace heat release and transfer rates, the water feed must, of necessity, be continuous and at all times proportioned to the steam produced, and at the same time take into account the necessary minimum and the desired maximum spillover or removal of excess water from the flow path. Furthermore, to accomplish the wide range in heat release with substantially instantaneous response to changes of conditions, and to perform the combustion process efficiently, there must be provided a method and means for operating such a vapor generator in accordance with varying conditions, and in a manner to positively insure tube wetness throughout the total flow path upon starting, and continued tube wetness throughout the generating section at substantially all times, and to further insure no overheating of superheater tubes, preferably keeping the superheated steam temperature constant at all loads.

In vapor generators of such character one of the major considerations is that of balancing, momentarily and continuously, the rate of heat release and absorption to the heat required to convert water into superheated steam, no matter how much or how suddenly the latter may change while at the same time proportionately, or equally, as may be required, dividing the whole of the feed water between each of the several tubes working in parallel and similarly dividing the heat absorbed by them. The construction provides for equal division of water by the use of controlling resistances, and equal division of total heat absorbed by each by locating each symmetrically with reference to the furnace and flowing furnace gases so that each is similarly exposed to radiation and similarly swept by gases, under similar temperature conditions, with resultant thermal symmetry throughout.

A further salient feature is the arrangement of the heating surface relative to the flow of the hot gases of combustion, which permits diversion of hot gases in a regulated manner, to adjust the heat absorbed by the superheater as compared with the other convection surface, or vice versa, in order to regulate steam outflow temperature.

Additionally, the steam generator of the present invention is, as heretofore stated, of the type wherein more feed water is supplied to each steam generating tube than is converted into steam in a single passage through each tube to the separator, and the manner of recovery of heat from such excess water withdrawn from the system at the separator is a feature of the invention. The recovery of such heat from the spillover water according to the present invention, may be done by transfer of its heat to one or more of the elements of combustion, and preferably to the air pumped to the furnace for combustion. Cooperating with this air heater, as another feature of the invention, is the interposition of an air-treating means wherein there may be a transfer of heat to the air from water leaving the economizer accomplished in a manner suitable to varying conditions of operation.

The following drawings, accompanying this specification, illustrate one form which the invention may take in practice, and are similar to one which has been built and installed for operation:

Fig. 1 is a diagrammatic representation of a steam generating system of the present invention delineating the sequence of working fluid flow through the various sections of the path of flow of the working medium, together with the flow of hot gases of combustion over the heat absorbing surface, without reference to geometry of shapes and position or to levels.

Fig. 1ᵃ diagrammatically illustrates a forced flow steam generator with superheater of the present invention in combination with the requisite control apparatus to insure the functioning of the same automatically with the required safety and flexibility of which it is capable.

Fig. 2 is a perspective view of a generator according to the present invention with its auxiliaries.

Fig. 3 is a perspective view of the generator with the enclosing casing partly broken away to indicate different sections of heating surface and the arrangement of parts.

Fig. 5 is a perspective view showing other parts of the arrangement of heating surface, but with sufficient of the heating surface shown in Fig. 4 broken away to indicate the reversal of portions of the respective tubes of one multiple set of flow path portions as they change from one level to another.

Fig. 6 is a sectional view in vertical plane on the line 6—6 of Fig. 7.

Fig. 7 is a sectional view in the vertical plane on the line 7—7 of Fig. 6.

Fig. 9 is a horizontal transverse section on the line 9—9 of Fig. 7.

Fig. 11 is a fragmentary sectional view on the plane of the line 11—11 of Fig. 9.

Fig. 12 is a fragmentary sectional view on the plane of the line 12—12 of Fig. 11.

Fig. 13 is an enlarged detail elevation of the water flow resistors, or distributors, and the manner of their arrangement.

Fig. 14 is a sectional view on the line 14—14 of Fig. 13.

Fig. 15 is an enlarged sectional view on the line 15—15 of Fig. 14.

Figs. 17 and 18 are diagrammatic views showing the division of the major space bounded by flat walls into four divisions by three partitions.

In detail:

The vapor generator is diagrammatically shown in Fig. 1 in a manner delineating the multiple flow passages, or parallel circuits, in their relation as to the direction of flow of working medium from feed water entrance to superheated steam outlet, and as to the furnace and the flow of hot gases, indicated thereon.

Referring to the diagram of Fig. 1 (and also with reference to Figs. 4 and 5) the boiling section or steam generator portion comprises eight individual flow passages, each continuous from water inlet to water and steam outlet at, and tangentially into, a separator 232. These eight passages, which are separate, long, small bore tubes are designated by the letters A to H inclusive and originate at an inlet header 204, there being interposed, however, between the said header 204 and each of said passages, an adjustable water flow resistance 205. One type of resistor is shown in detail in Figs. 13 to 15, and its function is to adjust for difference in flow resistance and heat input as between the respective passages, each of which is initially designed to be approximately equal in length and surface area, and so disposed as to absorb equal amounts of heat from the furnace and the hot gases.

The tubes A to H inclusive are disposed in an arrangement with respect to each other and to the source of heat such that there is a natural balancing of heat input to each individual passage, or equal division of the whole between them.

Figure 16:
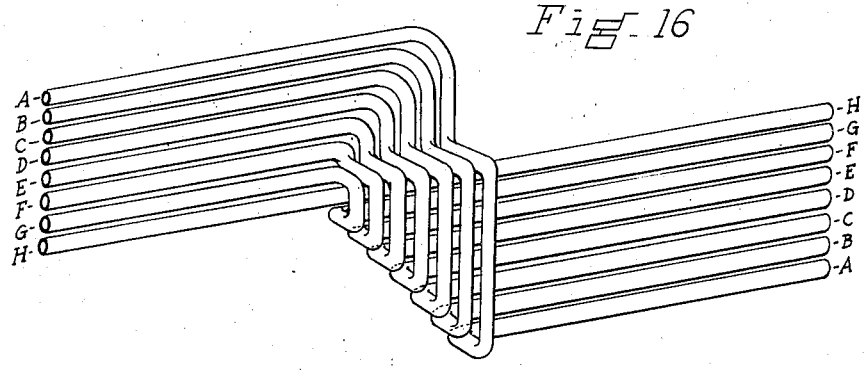
Fig. 16 is a perspective view showing how one set of parallel horizontal wall tubes, at different levels, are bent to reverse the relative levels of the same tubes of the set when the set as a whole changes level with respect to gas flow, so as to bring the bends outside of the plane of the wall, and where they are not exposed to heat, and where they are most accessible.

This arrangement for equalizing the heat absorbed by each of the eight long tubes in which steam is formed in parallel, and which is an important feature of the invention, provides for positioning them side by side in the walls of the furnace, gas passage, and partitions, as a set progressing to successively higher levels, bending them around corners, and also bending them otherwise, (as shown in Fig. 16) when the level is raised and the tube positions in the set are reversed; and it also provides for bending the tubes to form a transverse bank across the gas passage in a new way to not only cause each of the long bent tubes to absorb the same amount of heat radiantly, and by convection, but also prevents exposure of bends to heat at locations where there may be steam pockets with consequent damage from high tube metal temperature. Access to individual tubes is also provided in this arrangement.

Where the tubes are disposed in the vertical furnace wall they are horizontal and spaced apart approximately one tube diameter which permits of access and of adding any desired form of extended surface, such as is shown for example in Figs. 11 and 12, but of importance also in that it makes possible refractory filling in the intertube spaces which acts as a reradiating surface increasing the furnace temperatures and the intensity of radiant heat absorption per square foot of exposed tube surface, and this adjusts furnace gas exit temperatures and efficiency of furnace heat absorption, in addition to improving combustion.

The eight steam producing tubes A to H start at the bottom of the boundary wall and form a band eight tubes high all around the periphery, comprising, with the space filling refractory, and extended surface therebetween, the bottom of four flat walls, and the tubes of the set lie one over the other in this flat band bent around the corners.

Starting with the lowermost position of the set of eight tubes A to H, which are connected to the header 204 through the flow resistors 205, these tubes are designated with A indicating the lowest, and disposed in the order named one above the other.

After the set of eight tubes completes its circuit of the bottom of the unit boundary walls, it is then raised to a higher level (see Fig. 4) and disposed in a horizontal flat transverse coil of return bend loops extending the full width of the unit and to approximately one half the depth in the upflow gas passages III and IV behind the furnace I. The tubes thus bent lie one over the other so that they are horizontally in staggered relation to each other at successive levels. After thus forming one bank of horizontal staggered tubes eight tubes high, the eight tubes of the set are then bent to form another similar bank above the first one so that there is a bank of tubes across the gas passages III and IV sixteen tubes high, the whole being above the furnace bottom a distance equivalent to the wall band eight tubes high, for the gases to flow upward from the bottom across the double tube bank. As the gases are cooled by upward flow over the tubes it is necessary, for equalization of heat absorbed by each tube at successively higher levels in the set, in each successively higher level of the set to change its relative position in the set each time the level of the set is raised. For example, the lowest tube of the set in the lowest position of the set is given the highest position in the next higher position of the set, and again returns to the lowest position in the third level of the set.

The arrangement of the tube grouping is further diagrammatically indicated by the letters A to H as below:

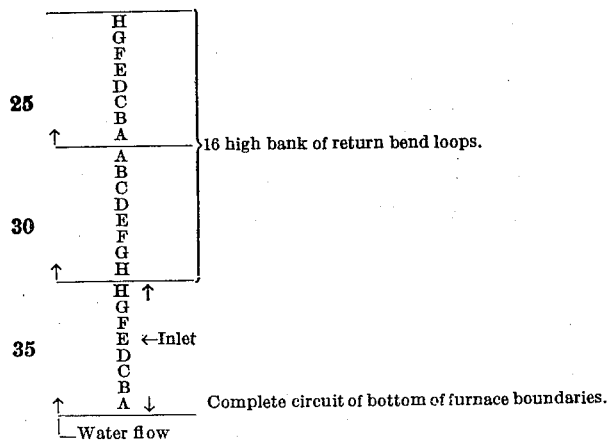

DIAGRAM A.

In this return bend loop flat coil transverse tube bank portion, the pile is self-supporting in that each coil rests upon the next adjacent one from top to bottom (see Figs. 3 and 4), but the coil lengths are vertically staggered, as to upflow of gases, except that, at the side walls of the unit and at the vertical partition wall dividing the upflow gas passage into parts III and IV, Fig. 17, the tubes are in contact in the same vertical plane to form substantially three (3) closed walls.

Portions of the length of alternate tubes in this transverse tube bank section are extended forwardly to circumscribe the sides and front boundaries of the furnace, while intermediate tubes are bent to lie between the furnace I and the upflow gas passages III and IV (see Figs. 4 and 5), whereby there is formed a partition between space I and spaces III and IV (Fig. 17), to form a U-shaped gas path from burners through outlet flues, the first leg being the flame space I, the bend the bottom space II, and the second leg the spaces III and IV which have a tube wall partition between them.

Continuing upwardly to a fourth and a fifth level, the same transverse return bend coil arrangement for the eight tubes of the set is preserved for a portion which extends approximately only half the width and depth of the unit in space III and with the level of the tubes in each set again reversed as the level of the set is raised.

There are four loops forming the width of this portion, the balance of the width of the unit being reserved for the superheater, as will be described later.

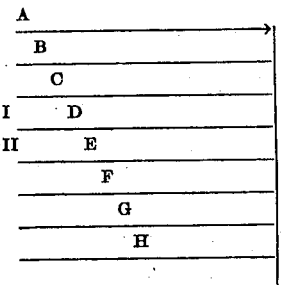

Roof tubes.

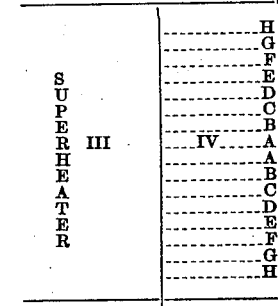

16 high half width bank of return bend loops.

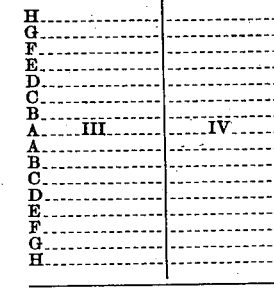

16 high full width bank of return bend loops.

Complete circuit of bottom of furnace boundaries.

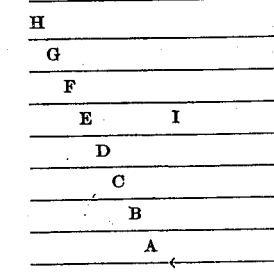

DIAGRAM B

Beyond the transverse return bend coil tube bank section just described the set of eight tubes is bent to again circumscribe the boundary walls of the unit and to extend across the top to provide roof tubes for the furnace (see Fig. 4) where local bends of the tubes accommodate burner openings, as shown, for downward firing. In these positions of the set the relative positions of the tubes are, of course, reversed with reference to their relative position in the set of the upper coils in the preceding looped portion.

It is to be understood that all of the steam is formed in horizontal tubes exposed to radiation, or swept by hot gases, whether the tubes lie in walls or extend across the gas streams, while the flame and hot gases pass first vertically downward from top to bottom, across the bottom and then vertically upward from bottom to top. Each long steam making tube, while horizontal, is so bent and positioned as to be on different levels for successive parts of its length, and the succession is always upward. In passing from one level to another the manner of accomplishing transposition or the reversal of relative levels of tubes in the set, or band of eight, as the level of the set is raised, is shown in Fig. 16, wherein each tube bends outside of the plane of the wall; and these bends are such as to cause the flow to be always upward between the horizontal parts of the tube exposed to heat.

As all of the length of each of the steam making tubes exposed to heat is horizontal, and the general trend is upward for successive parts of the length of each tube from one level to a higher level, the water entering at the bottom, and steam and water leaving at the top, steam will be continually moving with the water and cannot form local steam pocket zones that might overheat. Thus an important feature of the invention is the arrangement of horizontal tubes with generally upward flow exposed to heat in a vertical downward-fired furnace and first gas pass and a second vertical gas pass so as to prevent local overheating, when, as otherwise described, there is more water fed to each tube than can be evaporated.

While in the embodiment described we have divided the water into eight equal parts for eight steam making tubes, and arranged each tube to receive equal amounts of heat by radiation and convection transfer, it will be understood that the invention is not thus limited. We may use other than eight vaporizing circuits, the number varying with the size of the unit and with other conditions, but always more than one. Furthermore, since the essential thing is assurance of wetness of steam delivered by each, the water may be unequally divided between them when at the same time the heat absorbed by each is correspondingly and proportionately unequally divided by length or position with reference to the furnace and hot gas flow.

Further, referring to the diagram of Fig. 1, and also to the diagram Fig. 1ª of the control, the water enters the system through the control valve 17 in the supply pipe to the feed water pump 289 driven by the auxiliary turbine 287, which also drives the air pump 288 and fuel oil supply pump 290. The feed pump 289, which may be in duplicate, discharges water to the economizer 202, this being comprised of the primary economizer section 202 and the secondary economizer sections 202ª and 202ᵇ, each of these being of the type shown in Fig. 3 wherein vertically spaced horizontal headers are connected by horizontal tubes bent to form vertical flat return bend coils. Beneath the economizer 202ᵇ is the superheater 242 of substantially identical construction. Similarly constructed also are the primary and secondary air heaters 206 and 207, respectively, but these may advantageously have extended surface in the form of fins.

The flow of working fluid through the generator is from the feed pump 289 to the inlet header of the economizer 202, thence from the outlet header thereof to the inlet header of economizer unit 202ª from the outlet header of which it goes to the inlet header of economizer unit 202ᵇ and then through the final outlet header 201 of the combined economizer units; the interconnections between the units have no special construction except that they are in duplicate and enter, as shown, intermediate the ends of the headers, and hence they are not designated by reference character since their course is clearly indicated in the drawings.

From the economizer outlet header 201 the liquid goes through conduit 203 to the inlet header of the secondary air heater unit 207, and from the outlet header of which it passes to the manifold 204 serving the resistors 205 in each of the eight tube flow passages of the steam generating section of the heating surface A to H inclusive; the water entering the flow passages A to H then travels through the generator surface in the order of surface arrangement as previously described, and as shown in the diagrams on Diagrams A and B finally emerging from the roof tubes through the tangential inlets to the separator 232, said separator being illustrated in detail in the said copending application of E. G. Bailey Serial No. 55,020.

From the separator, where saturated steam and water are divided, the excess water leaves the separator as spillover at the bottom through fixed and variable spillover outlets 2 and 3 respectively, (see Fig. 1ª). The spillover water, at saturated vapor temperature, passes to the inlet header of the primary air heater 206 where some of its heat is recovered in the air being pumped to the fuel burners 4, and it then goes to the feed water heater 354.

All the air for combustion of the fuel is pumped into the unit over the primary and secondary air heaters 206 and 207 and passes through the burners 4 into the furnace where the flame burns downwardly toward the bottom, and here the gases are turned through 180° and travel upwardly through the two parallel gas paths passages III and IV separated by the division wall formed of the aligned tube lengths in the convection banks, and by a partition L which may be of any suitable heat resistant material, such as a metal or a non-metallic refractory body.

The air heater 207 has a special primary function in cooperation with the resistors 205 in equalizing the distribution of water from the economizers to the eight steam making tubes. At times the water from the economizer may carry some steam and if mixed steam and water reaches the distribution header 204, the equal division of both steam and water between the eight tubes cannot be effected. To prevent this, the steam must be condensed so that water only reaches the header 204, and the air heater 207 may act as an air cooled condenser to eliminate steam from the delivery header whenever steam enters the inlet header with the water.

The details of the construction of the generator, especially the walls and supports, are such that it is operated with positive pressure throughout the combustion chamber and gas paths in a manner similar to that described in the Bailey pending patent application hereinbefore referred to, all of the air for complete combustion being pumped into the system.

There is firstly the pile of tubes wherein the combustion chamber I is formed of boundary tube lengths which are studded as shown in Figs. 11 and 12 in the manner of the invention set forth in the pending application of E. G. Bailey, Ser. No. 39,010, filed June 3, 1935, and Harter et al. Patent, 2,077,410, the studs being indicated as four rows 300, 301, 302, 304 at the rear of the exposed heat absorbing surface 305 of each tube and embedded in refractory material 306. The entire generator is surrounded by a covering of two layers of insulating material, one of them, 307, capable of withstanding high temperature and the other 308, outside, being such, for instance, as 85% magnesia and which has applied thereto a protective metal casing 309. The entire structure is stabilized by upright columns 310 and angles 311 together with transverse members 312 and 313 which form a suitable framework through being connected in any well known manner as, for instance, by welding. The side panels 309 of metal have stiffeners 314 and 315 applied thereto; the whole being arranged to resist destruction or leakage from the positive pressure maintained on the inside and which is greater than the existing pressure on the outside.

Within the enclosed structure just described there are dependent supports 316 and 317 which are in the nature of tension rods secured to the tubes of the economizer sections and the superheater which support the same from above through carrying members 318 and 319 respectively at the inner wall or division between the furnace chamber and gas paths. The supporting member 319 is carried by the lower end of strips 320 which are also dependent from the support 318. At the outer wall end the tube loops are supported one from the other as indicated at 321 from their upper headers.

The economizer 202 is similarly supported by members 322 at one side adjacent the headers, and by hanging members 323 and 324 having rods 325 and 326 respectively hooked over the lower ends of members 327 dependent from the cross beam 328, and the tubes of the economizer are, of course, enclosed within walls similar to those of the main portion of the generator.

Figure 4:
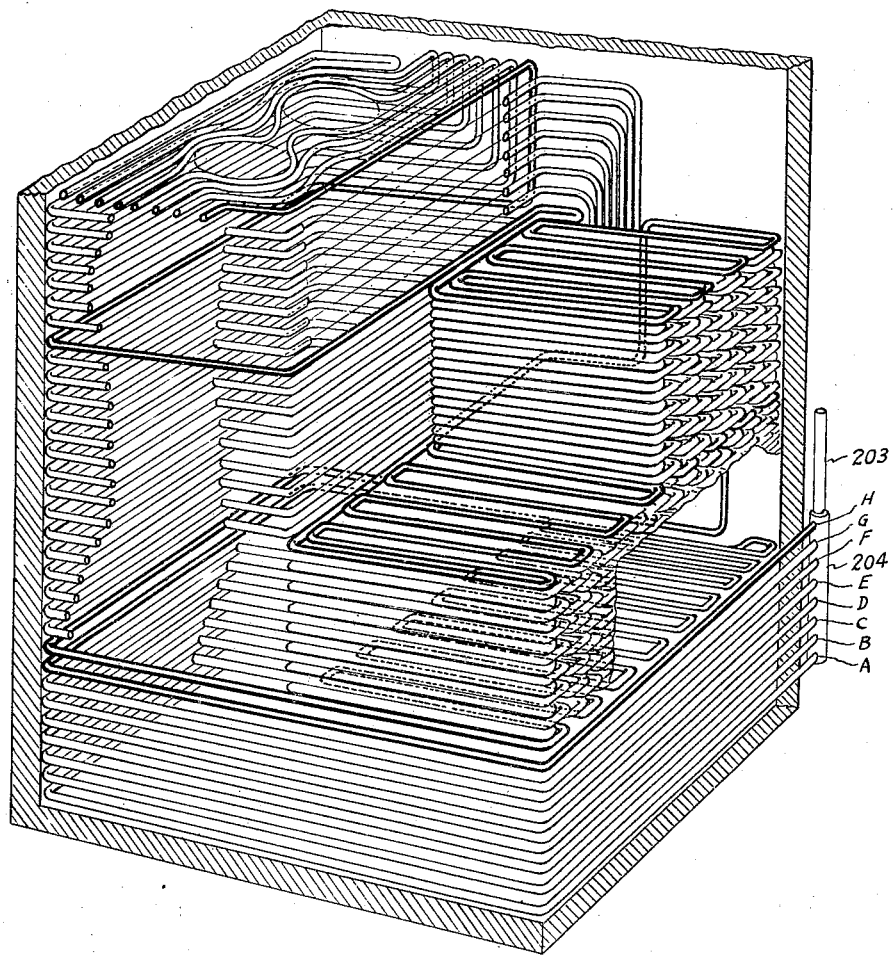
Fig. 4 is a somewhat diagrammatic perspective view partly cut away showing other parts of the arrangement of the heating surface.

At the top and to one side of the boiler assembly is an enclosure 329 carried on beam extension 330 and supporting the primary and secondary air heaters 206 and 207 which receive their air at the entrance 208 from the air pump 288 and deliver it to the windbox 331 across the top of the furnace chamber and through which there are burner openings 332 receiving the burners 4 delivering between the roof tubes which are deformed, as shown in Fig. 4, and into the furnace I. Vanes 333 are located to guide the air where the flow turns at right angles to enter the windbox 331, and a damper 334 operating upon the spindle 335 from a lever 336 regulates the flow of air from the air heaters to the burners. The windbox of the furnace is isolated from the waste gas outlet flow through the economizer by a partition 337 secured to a beam 338 which together with the casing of the generator furnishes support for two series of dampers M and N (designated at 83 in Fig. 1a), each of which consists of the damper elements 339 carried on spindles 340 to which are attached levers 341, the levers being secured together in groups M and N by the damper bars 342, and, in turn, each group being secured to the other for operation in such a manner that either one group or the other is open or closed, but never are both in the closed or open position simultaneously. This damper arrangement, by reason of the dividing wall in the path of the gases between passages III and IV, Fig. 18, is enabled, by proper manipulation, to pass all of the gases of combustion through the gas passage IV to sweep the economizer 202a, if the group of dampers N is closed and M open, or by closing the group of dampers M and opening those designated as N, all of the gases may be passed through gas passage III to sweep the superheater 242 and economizer 202b, or by intermediate positions the amount passing over each may be regulated to adjust the superheat temperature.

With the foregoing it will be observed that the arrangement and disposition of the heating surface, to equalize heat received by each of the eight tubes of the steam generating set, is such that thermal-symmetry is attained throughout the generator, and with it equalization of water supply results in equalizing of quality of steam as to moisture in the superheater, and with this arrangement there is then provided a control mechanism illustrated in Fig. 1a for operating the generator.

In connection with the operation of the generator it must be remembered that steam delivery to the prime mover, or throttle position on the superheater steam pipe, will be the means which will determine the output or rate of steam generation.

Also, with small liquid and heat storage and high heat release capabilities, the feed water supply must of necessity be continuous and at all times proportioned to steam outflow, at the same time taking into account the desired diversion of gases for superheat purposes, and of liquid from the flow path at the separator and with maximum and minimum limit of quantity, and there must also be provided means which will render the generator instantaneously responsive to varying conditions of rate of generation as to magnitude or suddenness of changes while maintaining a high degree of efficiency for all conditions within its range of operation from zero capacity upward while insuring safety of operation.

In Fig. 1a there is shown a diagram of a method and apparatus controlling the functioning of a boiler of the character described cooperating with it to insure the fulfillment of its capabilities, and which is the subject of a separate application Ser. No. 55,023 filed concurrently herewith in the name of Paul S. Dickey.

Considering the type of boiler the steam-making section of which, as before stated, is comprised of separate long small bore tubes connected in parallel between suitable headers or junction connectors and receiving water at one end and delivering a mixture of steam and water at the separator, and subsequently delivering only superheated steam at the outlet while discharging from it the excess water delivered to the separator, the operation of the generator is as follows:

The water from the economizer header 201 is delivered to the header 204, from which the water is distributed to the generating section comprising the eight tube circuits A to H receiving their water through flow resistors 205. Each of these flow resistors, as shown in Figs. 13 to 15 inclusive, has a connecting portion 343 taking water from the manifold 204 through the coupling 344 then through a long small bore coil 345 which imposes a greater flow resistance or pressure drop than the pressure drop through the particular circuit A to H to which it is connected. The length of each particular resistor coil of given bore 345 is calculated for each circuit A to H so each will receive the same fraction of the total amount of water at all times. The ends of these coils 345 are coupled as at 346 to the base 347, forming a cap welded as at 348 to the end of the circuit A to H supplied by the resistor. The base 347 carries a ring 349 welded thereto and which has spun thereover the end 350 of a Sylphon 351, the other end of which is spun over a similar collar 352 screwed into the plate 353 of the furnace casing, and there is thus provided a gas-tight connection between the furnace casing and the resistors which permits of relative expansion and contraction of the flexible connected parts. From the resistors 205 equally dividing the water, such liquid in each tube travels successively through the lower furnace wall portions, the convection bank portions, the partition wall portions, the upper furnace wall portions, and the roof tube portions of the length of the tubes in the order named, and finally discharges from the roof ends of the tubes to the separator 232. From the separator the excess water, as spillover, passes through the fixed outlet orifice 2 and the variable outlet orifice 3 to the primary air heater 206 and thence to the open feed water heater 354, vented as at 355, where it serves to commingle with, and to heat, incoming feed water delivered by the pipe 356 to the booster pump 357, and then through a strainer 358 to a battery of two feed pumps 289 driven by the auxiliary turbine 287, which also drives the air pump 288 and the fuel oil pump 290, all of which elements have been indicated diagrammatically in Fig. 1a.

Referring now particularly to the diagrammatic illustration of Fig. 1a, the flow path from feed water entrance to superheated steam outlet has been indicated as a single sinuous tube with a separator intermediately. Water is supplied to the economizer section 202 through a pipe 11 from the pump 289, which, as illustrated in Fig. 2, is a positive displacement pump, the delivery of which is closely proportioned to its speed, but it may be of any suitable type.

From the economizer section 202 the liquid passes to the steam making or generating section, the air heaters having here been omitted from the diagram for the purpose of making a clearer diagram, inasmuch as air heating is not involved in the control. From the generator section the water and saturated steam discharge together to the separator 232. From the separator saturated steam passes through the superheater 242, leaving by the conduit 244 connected to the main steam turbine 12 illustrative of any vapor utilizing device of prime mover. The products of combustion successively pass the generating section, the superheater and the economizer and may contact a part or all of the convection surface as will be hereinafter referred to, depending upon the position of the damper groups M and N.

An auxiliary turbine 287 drives the feed water pump 289, the air pump 288, and the fuel oil supply pump 290. These elements are all driven by the same shaft though they may be at different initial speeds, the necessary gear reductions or driving mechanism between the several devices not being illustrated. The quantity of feed water is very nearly proportional to the speed of the feed pump.

The rate of fuel oil supply to the burners 4 is primarily controlled by the speed of the oil pump 290, but the supply of oil is further regulated by throttling of the regulating valve 13 located in the pipe 5; the rate of flow in the pipe 5 is continuously measured by the meter 14.

The rate of supply of air to support combustion is primarily determined by the speed of the blower 288, but is further under control of the damper 15 positioned in the conduit 7 at the outlet of the blower, since there must be adjustment of delivery to maintain the proper fuel-air ratio in view of the fact that the blower is not a positive displacement pump as is the case with the fuel and water pumps. The rate of supply of air is continuously measured by a flow meter 16.

The rate of supply of liquid under pressure through the conduit 11 is controlled by the speed of the pump 289, but is further influenced through the position of the regulating valve 17 at the suction side of the pump and by the regulating valve 18 in the by-pass around the pump.

In the operation of such a vapor generator certain variables are measured, indicated and utilized as the basis for automatically controlling the supply of liquid throughout, and the supply of elements of combustion to the heating furnace.

The control system, details of which are shown in said copending application of Paul S. Dickey, Ser. No. 55,023, is as follows:

At 19 there is indicated a pressure responsive device such as a Bourdon tube connected to the conduit 244 and provided with an indicating pointer 20 cooperating with an index 21 for advising the instantaneous value of the steam outflow pressure. At 22 is a temperature responsive device, such as a Bourdon tube, forming part of a temperature sensitive system adjacent the conduit 244 and having an indicator pointer 23 adapted to cooperate with an index 24 for advising the instantaneous value of the steam outflow temperature and regulating the position of the superheat control dampers at 83 (M and N).

As an indicator of generator output there is a flow meter 78 connected to the conduit 244 across an orifice or other restriction 79. This flow meter is adapted to vertically position a pilot 43 to vary an air loading pressure effective upon the relay 47 proportional to the steam outflow.

Figure 8:
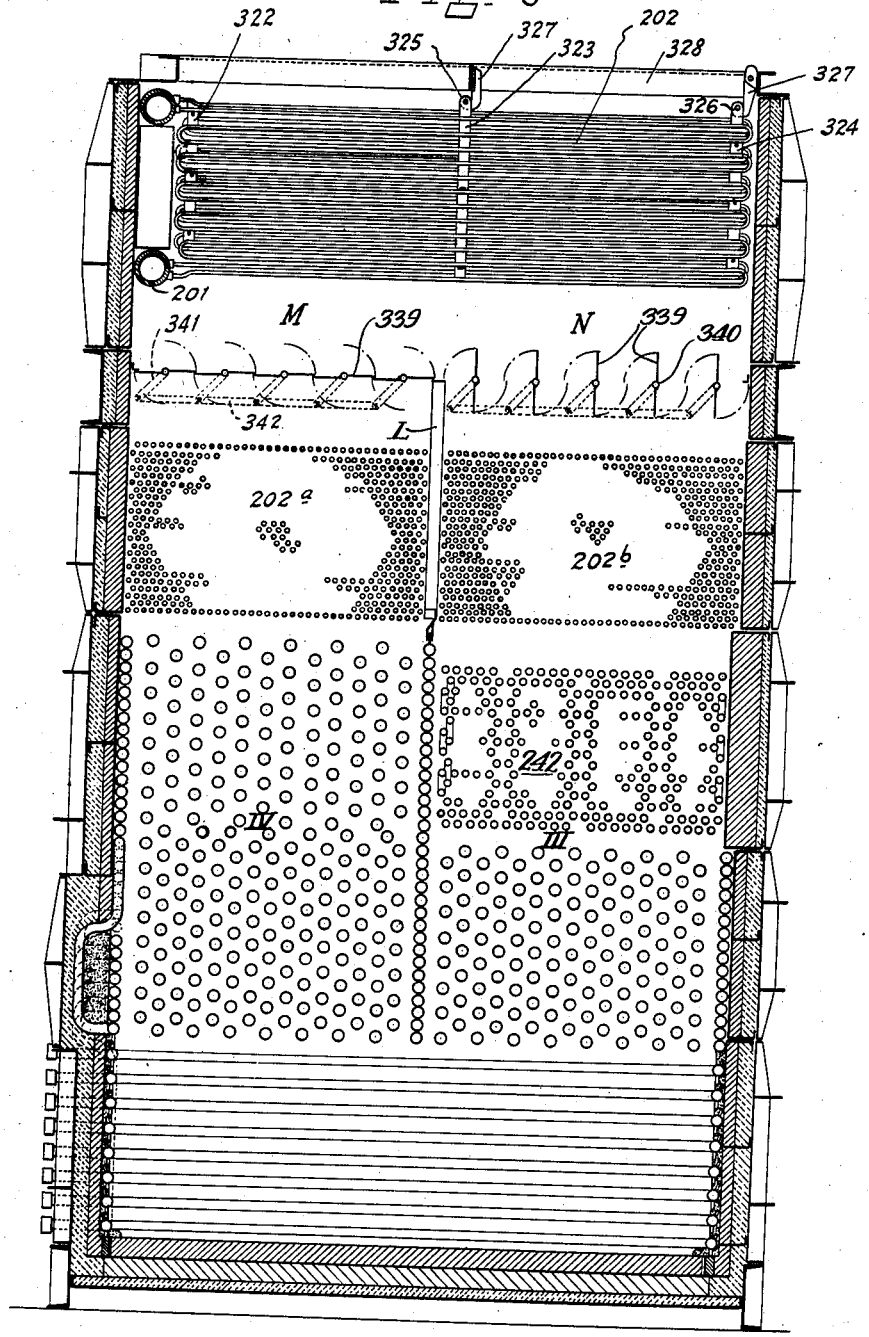
Fig. 8 is a vertical sectional view on the plane of the line 8—8 of Fig. 7.
Figure 10:
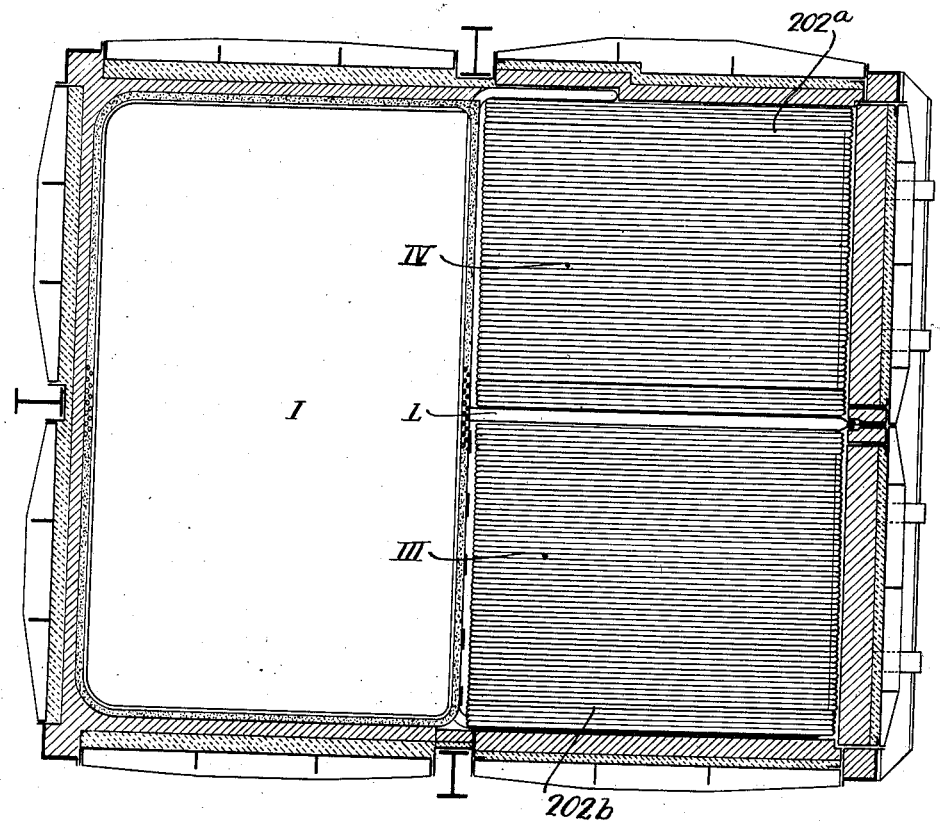
Fig. 10 is a similar view on the line 10—10 of Fig. 7.

The Bourdon tube 22 positioned responsive to variations in steam outflow temperature is adapted to vertically position a pilot stem 80 for varying an air loading pressure through the connection 81 upon a pneumatic actuator 82 for positioning a set of dampers 83 which may correspond to the groups of dampers M and N of Figure 8. These dampers, as previously stated, are so located relative to the fluid path through the vapor generator and relative to control of gas flow that they control the heat absorption of different portions of the steam generator flow path and thus control the steam outflow temperature.

29 represents means responsive to water level within the separator 232 and constitutes a pressure casing enclosing a mercury U-tube connected across the vertical elevation of the separator. A float is adapted to rise and fall with the surface of the mercury in one leg and to thus cause a positioning of a pointer 30 relative to an index 31 to advise the instantaneous value of water level within the separator.

The flow meter indicated in general at 14 for providing a measure of the rate of supply of fuel to the furnace may be of such a type as is disclosed in the patent to Ledoux, No. 1,064,748. Such a meter is a differential pressure responsive device adapted to correct for non-linear relation between differential pressure and rate of flow, to the end that angular positioning of a pointer 32 relative to the index 33 is by increments directly proportional to increments of rate of flow. There is illustrated by dotted lines within the flow meter 14 the outline of the internal construction wherein is a liquid sealed bell having walls of material thickness and shaped as described and claimed in the above mentioned Ledoux patent.

The flow meter 16 for measuring the rate of supply of air for combustion is similar to the meter 14 and positions a pointer 36 relative to an index 37 to thereby provide a continuous indication of the instantaneous rate of flow of air to the furnace. Primarily the control of the supply of water to the fluid flow path and the elements of combustion to the furnace is through variation in speed of the auxiliary turbine 287, utilizing the water inflow to the generator as the basis for such control. Realizing, however, the possible difference in characteristics of the pumps 290 and blower 288, as well as variations in conditions of operation, there is provided readjusting means supplementing the primary control of the elements of combustion. For the air, such readjusting means is a damper 15, positioned at the inlet to the blower 288 and moved by a pneumatic actuator 38. For the fuel, the readjusting means comprises the regulating valve 13 positioned in the pipe 5 and responding to departure from desired relation of the measure of fuel flow and the measure of air flow.

The speed of the auxiliary turbine is regulated through varying the opening of governor valves 39 adapted to admit relatively low pressure steam to the turbine, and at certain rates of operation to supplement this by additionally supplying relatively high pressure steam. For example, the low pressure steam may be the exhaust from the main turbine 12 or extraction steam therefrom, while the high pressure steam may be direct from the steam generator. A pneumatic actuator 40 positions the valves 39 under the influence of an air loading pressure established by a standardizing relay 41 the details of which are illustrated and described in the said copending application of Paul S. Dickey, Ser. No. 55,023.

Regulation of water inflow (through variation in speed of the water pump) is preferably accomplished by regulation responsive to water inflow, steam outflow, and level of water in the separator.

As previously mentioned, the flow meter 18 is responsive to a measure of steam outflow from the generator and this vertically positions a pilot valve stem 42 relative to a pilot valve casing 43, to which a supply of compressed air may be available, as indicated by the small arrow. Such a pilot valve is shown in detail and forms the subject matter of copending application of Clarence Johnson, Ser. No. 673,212, filed May 27, 1933.

All air for combustion is pumped under pressure to the casing 6 and by reason of the construction of the pilot valve if the stem 42 is moved upwardly there is available a loading pressure increasing in definite relation to such movement, while if the stem 42 is moved downwardly there is available a pressure also increasing definitely with such movement. Pipes, or capillaries, for transmitting such air loading pressures are indicated throughout the drawings by dotted lines to distinguish them from other devices or conduits; such a connection is illustrated at 46 for transmitting an air loading pressure bearing a known relation to rate of vapor outflow to a differential relay device 47.

In similar manner the liquid level indicator 29 vertically positions a pilot stem 48 to establish at the relay 47, through the connection 49, an air loading pressure representative of liquid level. Pressure from this relay, in the manner described in said copending application of Paul S. Dickey Ser. No. 55,023, is transmitted through a connection 62 to a spring loaded diaphragm actuator for positioning the valve 17 in the suction line to the water pump, and thus it will be evident that variations in the loading pressure effective through the connection 46, or effective through the connection 49, will be effective to vary the air pressure and correspondingly actuate the spring loaded diaphragm actuator for positioning the valve 17.

The valve 17 functions as a variable orifice across which there will exist a pressure differential having a known relation to the rate of flow of liquid through the valve 17. Pressures on opposite sides of the valve are effective through the pipes 63 and 64 upon the standardizing relay 41.

This standardizing relay is described in said copending application of Paul S. Dickey Ser. No. 55,023, as well as that of Harvard H. Gorrie, Serial No. 8,047, filed February 25, 1935. A loading pressure established by the relay 41 is effective through a connection 68 upon the pneumatic actuator 40 for positioning the turbine valves 39 in a manner to prevent over-travel and hunting due to the characteristics of the relay 41, and thus the positioning of the actuator 40 will not necessarily be directly with the positioning of the valve 17.

In general, the valve 17 is positioned responsive to vapor outflow and to water level within the separator and, as stated, forms a variable orifice in the suction line to the water pump. The relay 41 receiving the differential pressure across the valve 17 positions the actuator 40 and the turbine valves 39 to control the speed of the water pump 289 in such a manner that the differential pressure across the valve 17 will be held constant regardless of the opening of valve 17 and thus the flow to the water pump is controlled proportional both to steam outflow, and to water level within the separator.

If steam outflow increases, then the pilot valve stem 42 is raised proportionally, thus proportionally increasing the loading pressure effective through the connection 46, causing a downward movement of the relay stem 47 thereby increasing the air loading pressure through the connection 62. The resulting change in opening of the valve 17 varies the pressure differential effective upon the relay 41 changing the loading pressure effective through the actuator 40 to position the auxiliary turbine throttle valves 39, and thereby results in an increased flow of water through the conduit 11 commensurate with the increase in vapor outflow from the vapor generator. Should the liquid level within the separator 232 tend to fall, the pilot valve stem 48 will be raised, thus increasing the loading pressure in the relay 47 and in like manner further opening the valve 17 supplying water to the pump to thereby result in an increase in the supply of water to the generator.

It will then be observed that the valve 17 is positioned responsive to steam outflow from the generator and water level in the separator, while the speed of the water pump is not only responsive to these two variables but additionally to the rate of flow of water to and through the pump.

The water level responsive device 29 further controls, through the pilot valve stem 48, the positioning of the variable spillover valve 3 in such manner that upon a rise in water level within the separator 232 above a predetermined elevation there will be a regulated opening of the valve 3 to supplement the normal spillover 2 to the pipe line 1. Certain features relating to multiple and sequential control from liquid level within the separator are disclosed and claimed in the co-pending joint application of E. G. Bailey and Paul S. Dickey, Ser. No. 55,025, filed Dec. 18, 1935.

Under the control of steam outflow pressure acting upon the Bourdon tube 19, there is provided a pilot valve 69 for establishing an air loading pressure through the connection 70 to position the by-pass valve 18 of the pump delivery and the damper 15. Upon a fall in steam pressure from a predetermined value the valve 18 and the damper 15 both tend to open, each from a predetermined position. This action is particularly desirable upon sudden material increases in load upon the unit as a whole which would otherwise cause a marked decrease in steam pressure. When such sudden and material increases in steam outflow occur, thereby tending to lower the steam pressure, the auxiliary turbine speed is increased and the damper 15 is opened. At such time it is desired to increase the supply of fuel and air without immediate increase in supply of water. By-passing the pump by means of the valve 18 reduces the water flow through conduit 11 and valve 17 and causes the auxiliary turbine to speed up to restore the original water flow and in so speeding up increases the air flow and fuel flow. Without the bypass not only would this advantage be lost but the momentary increase in water inflow when the auxiliary turbine speed is increased would be more than would be desired to utilize the small available heat storage of the unit. The adjustment of the actuator 38 and of the valve 18 is preferably such that they will be responsive only to predetermined variations in steam pressure corresponding to air loading pressure in the connection 70. For example, the damper 15 may be regulated as to position upon any departure of steam pressure from predetermined value in either direction, while the valve 18 may be completely closed until steam pressure has fallen a predetermined amount below the desired standard. Beyond that point the valve 18 would begin to open and the damper 15 may, or may not, be completely open while the opening of the valve 18 is being regulated.

The elements of combustion are preferably primarily controlled through varying the speed of the auxiliary turbine and thereby the speed of the blower and oil pump in unison with the liquid inflow. Having readjusted the air supply through a positioning of the damper 15, and provided a measure of air flow by the meter 16, there is then utilized the regulating valve 13 in the oil supply line to properly proportion fuel to air. To this end the meters 14 and 16 are inter-connected with linkage 71 for positioning a pilot valve stem 72 to establish an air loading pressure through the connection 73 of a standard relay 74. The air loading pressure resultant from operation of the relay 74 is effective through a connection 75 for positioning the regulating valve 13 upon departure of air flow-fuel flow relation from predetermined value, and simultaneously is effective for positioning a regulating valve 76 for control of atomizing steam supplied to the oil burner 4 through a pipe 77.

The automatic control circuit corresponding to the foregoing is fully described in said copending application of Paul S. Dickey, Ser. No. 55,023, and includes electrical means and circuits for actuation thereof. The unit upon initial starting is first placed under pressure by igniting the main burners 4 through the medium of a gas fired torch 8 and spark ignition device S, the gas torch 8 being supplied with fuel through the tube 9 controlled by a valve 10. The unit goes through a lighting cycle which is discontinued in the event of flame failure by a flame failure device so that relighting is provided for through the photo-electric cell U.

Various safety trips are also provided but the automatic setting of all controls is such that upon initial ignition by the torch 8 of the main fuel burner the controls immediately become active to place the unit in operation and under pressure after which the whole system is responsive to steam outflow through the conduit 244.

In operating this boiler a drain line will be provided from the superheater outlet either to the condenser or the hot well and this drain will be opened and the hot well or booster pump 357 then started. The auxiliary turbine 287 is then placed in operation which, of course, immediately starts the feed water pump, blower and fuel pump, 289, 288 and 290 respectively. The starting of this auxiliary set fills the separator 232 and circulates water through the superheater drain back to the hot well and booster pump 357.

The steam supply to a fuel oil heater, not shown, is then turned on and the automatic control equipment placed in service at this time by opening an air supply line to the control. Immediately upon the placing in operation of the automatic control the auxiliary turbine is automatically held at minimum speed due to the fact that there is no steam flow through the measuring orifice, and also due to the high level in the separator drum. The pressure control maintains the dampers wide open but with only a limited air flow available due to the fact that the auxiliary turbine driving the blower is set to run at a minimum speed. After the main burner is lighted the control adjusts for increase of excess air which keeps the firing rate at a low value. As soon as the generator is started the automatic control takes care of the relationship between air and fuel. The spillover valve from the separator is maintained wide open by the high level in the separator but cannot empty the separator to a normal level until the generator pressure is brought up and flow of water is, during starting, divided between spillover and superheater outlet drain. When these conditions are attained the main fire is lighted, which is accomplished by simply closing a switch in the current supply line to the burner lighting equipment. Closing of this switch energizes the igniters and starts the flow of fuel to an automatic lighting torch. After a time delay the oil flow-air flow ratio control regulates a valve in the oil line to maintain oil flow equal to air flow, and as soon as the oil fire ignites the torch and igniters are automatically cut out. As soon as boiler pressure is attained the separator begins to empty. As the level is reduced to a controlling range the excess spillover valve closes and the separator level then takes over control of the auxiliary turbine speed to the value required by the water passing through the constant spillover line and the steam going out of the superheater drain line.

When the generator reaches the operating pressure it is put on the line by opening a shut-off valve at the superheater outlet or through the action of a non-return valve and the drain at the superheater outlet is then closed. The speed of the auxiliary turbine and the auxiliary driven thereby is then regulated by vapor outflow measured in accordance with the demand for vapor and the various other controls make the necessary readjustments to maintain proper operating conditions.

While the working fluid has been defined as water vaporizing into steam it will be understood that other liquids and their vapors may be substituted and that my invention includes vapor generators in general, and is not limited to steam boilers.

We claim:

1. In a forced circulation generator delivering superheated steam, an upright U-shape passage with means for pumping elements of combustion in ignitable form into one end thereof, economizer, steam generating and superheating sections, each comprised of a multiplicity of long small bore tubes arranged for parallel flow between end junctions, all of the tube portions of said sections being horizontal where exposed to heating, and each of the steam generating tubes having portions exposed to heating in both legs of the passage whereas the economizer and superheating tubes are arranged for exposure to heat only in the upward flow part of the passage, and means supplying water to each of the steam generating tubes.

2. In a forced circulation boiler delivering superheated steam, an upright U-shape passage with means for pumping elements of combustion in ignitable form into one end thereof, economizer, steam generating and superheater sections each comprised of a multiplicity of long small bore tubes arranged for parallel flow with a junction common to the steam generating and superheating sections providing a means of removing unevaporated water from saturated steam, all of the tube portions of said sections being horizontal where exposed to heating, and each of the steam generating tubes having portions exposed to heating in both legs of the passage while the economizer and superheater tubes are arranged for exposure to heat only in the upward flow part of the passage, and means supplying water to each of the steam generating tubes at a rate exceeding its ability to completely evaporate the same in advance of the superheater section.

3. In a forced circulation boiler delivering superheated steam, an upright U-shape passage with means for pumping elements of combustion in ignitable form into one end thereof, economizer, steam generating and superheater sections each comprised of a multiplicity of long small bore tubes arranged for parallel flow with a junction common to the steam generating and superheating sections providing a means of removing unevaporated water from saturated steam, all of the tube portions of said sections being horizontal where exposed to heating, and each of the steam generating tubes arranged at successively higher levels as to internal flow and having portions exposed to heating in both legs of the passage while the economizer and superheater tubes are arranged for exposure to heat only in the upward flow part of the passage, and means supplying water to each of the steam generating tubes at a rate exceeding its ability to completely evaporate the same in advance of the superheater section.

4. In a forced circulation boiler delivering superheated steam, an upright U-shape passage with means for pumping elements of combustion in ignitable form into one end thereof, economizer, steam generating and superheater sections each comprised of a multiplicity of long small bore tubes arranged for parallel flow with a junction common to the steam generating and superheating sections providing a means of removing unevaporated water from saturated steam, all of the tube portions of said sections being horizontal where exposed to heating, and each of the steam generating tubes having portions exposed to heating in both legs of the passage while the economizer and superheater tubes are arranged for exposure to heat only in the upward flow part of the passage, means supplying water to each of the steam generating tubes at a rate exceeding its ability to completely evaporate the same in advance of the superheater section, and means for dividing the water supplied in accordance with the evaporative requirements of each steam generating tube.

5. In a forced circulation boiler delivering superheated steam, an upright U-shape passage with means for pumping elements of combustion in ignitable form into one end thereof, economizer, steam generating and superheater sections each comprised of a multiplicity of long small bore tubes arranged for parallel flow with a junction common to the steam generating and superheating sections providing a means of removing unevaporated water from saturated steam, all of the tube portions of said sections being horizontal where exposed to heating, and each of the steam generating tubes arranged at successively higher levels as to internal flow and having portions exposed to heating in both legs of the passage while the economizer and superheater tubes are arranged for exposure to heat only in the upward flow part of the passage, means supplying water to each of the steam generating tubes at a rate exceeding its ability to completely evaporate the same in advance of the superheater section, and means for dividing the water supplied in accordance with the evaporative requirements of each steam generating tube.

6. In a forced circulation boiler, a multiplicity of long small bore steam generating tubes with means supplying water to each at a rate exceeding its evaporative capacity between inlet and outlet terminals, parallel gas passages one of which includes a furnace fired by elements of combustion, each of said steam generating tubes being horizontal where heat is absorbed and bent so that different portions of the length of each are disposed in the walls of the furnace, in a wall of a gas passage, and in a wall dividing the gas passages.

7. In a forced circulation boiler, a multiplicity of long small bore steam generating tubes with means supplying water to each at a rate exceeding its evaporative capacity between inlet and outlet terminals, parallel gas passages one of which includes a furnace fired by elements of combustion, each of said steam generating tubes being horizontal where heat is absorbed and bent so that different portions of the length of each are disposed in the walls of the furnace, in a wall of a gas passage, and in a wall dividing the gas passages, and also transversely across a vertical stream of hot products of combustion.

8. In a forced circulation boiler, a multiplicity of long small bore steam generating tubes with means supplying water to each at a rate exceeding its evaporative capacity between inlet and outlet terminals, parallel gas passages one of which includes a furnace fired by elements of combustion, each of said steam generating tubes being horizontal where heat is absorbed and bent so that different portions of the length of each

CERTIFICATE OF CORRECTION.

Patent No. 2,170,345.                                August 22, 1939.

ERVIN G. BAILEY, ET AL.

It is hereby certified that error appears in the printed specification of the above numbered patent requiring correction as follows: Page 4, first column, line 71, for "III" read IV; page 5, second column, line 32, strike out the word "paths"; page 11, first column, line 75, claim 11, before "full" insert the; and that the said Letters Patent should be read with this correction therein that the same may conform to the record of the case in the Patent Office.

Signed and sealed this 24th day of October, A. D. 1939.

Henry Van Arsdale,
(Seal)                              Acting Commissioner of Patents.

CERTIFICATE OF CORRECTION.

Patent No. 2,170,345. August 22, 1939.

ERVIN G. BAILEY, ET AL.

It is hereby certified that error appears in the printed specification of the above numbered patent requiring correction as follows: Page 4, first column, line 71, for "III" read IV; page 5, second column, line 32, strike out the word "paths"; page 11, first column, line 75, claim 11, before "full" insert the; and that the said Letters Patent should be read with this correction therein that the same may conform to the record of the case in the Patent Office.

Signed and sealed this 24th day of October, A. D. 1939.

(Seal)

Henry Van Arsdale,
Acting Commissioner of Patents.